Patented Mar. 21, 1950

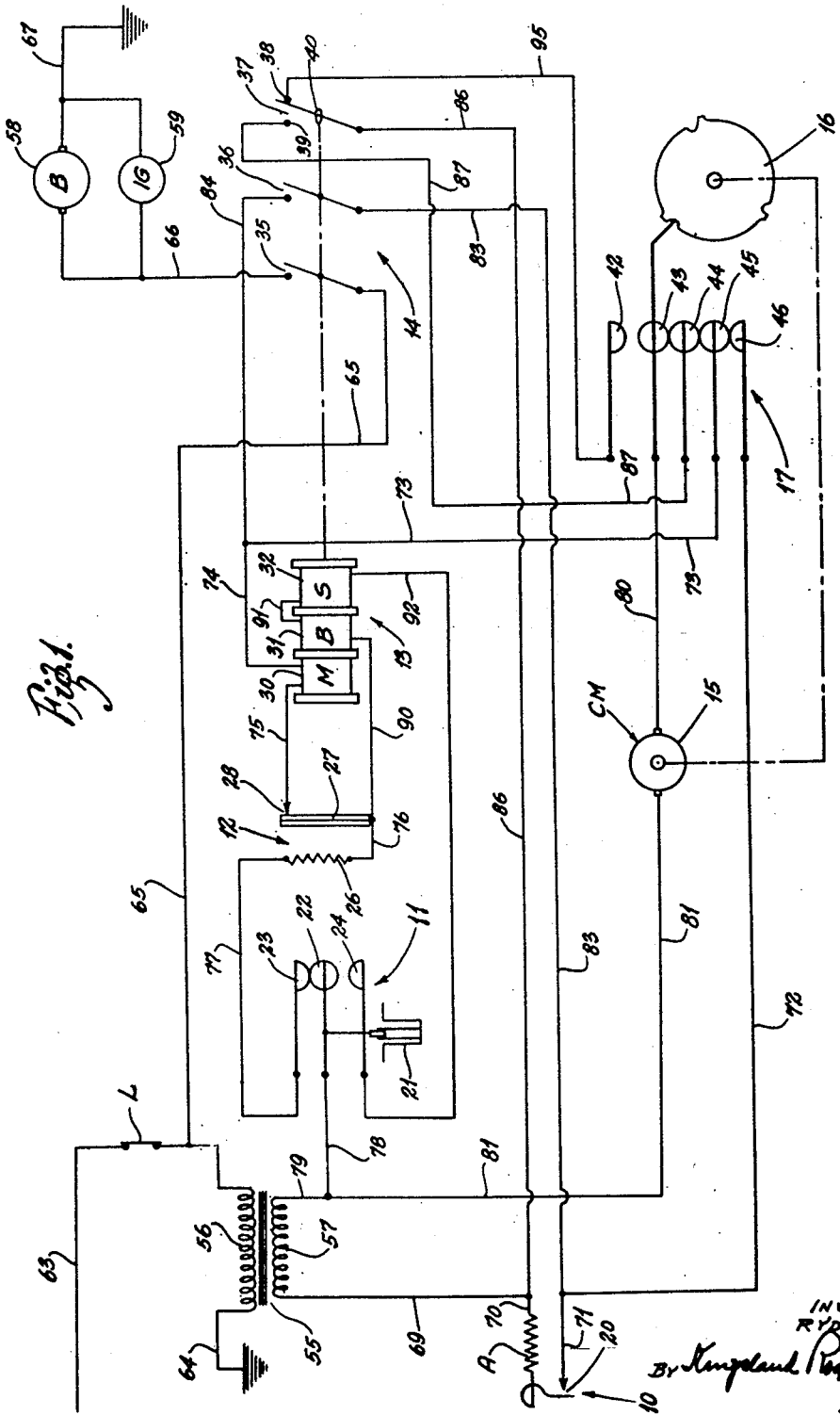

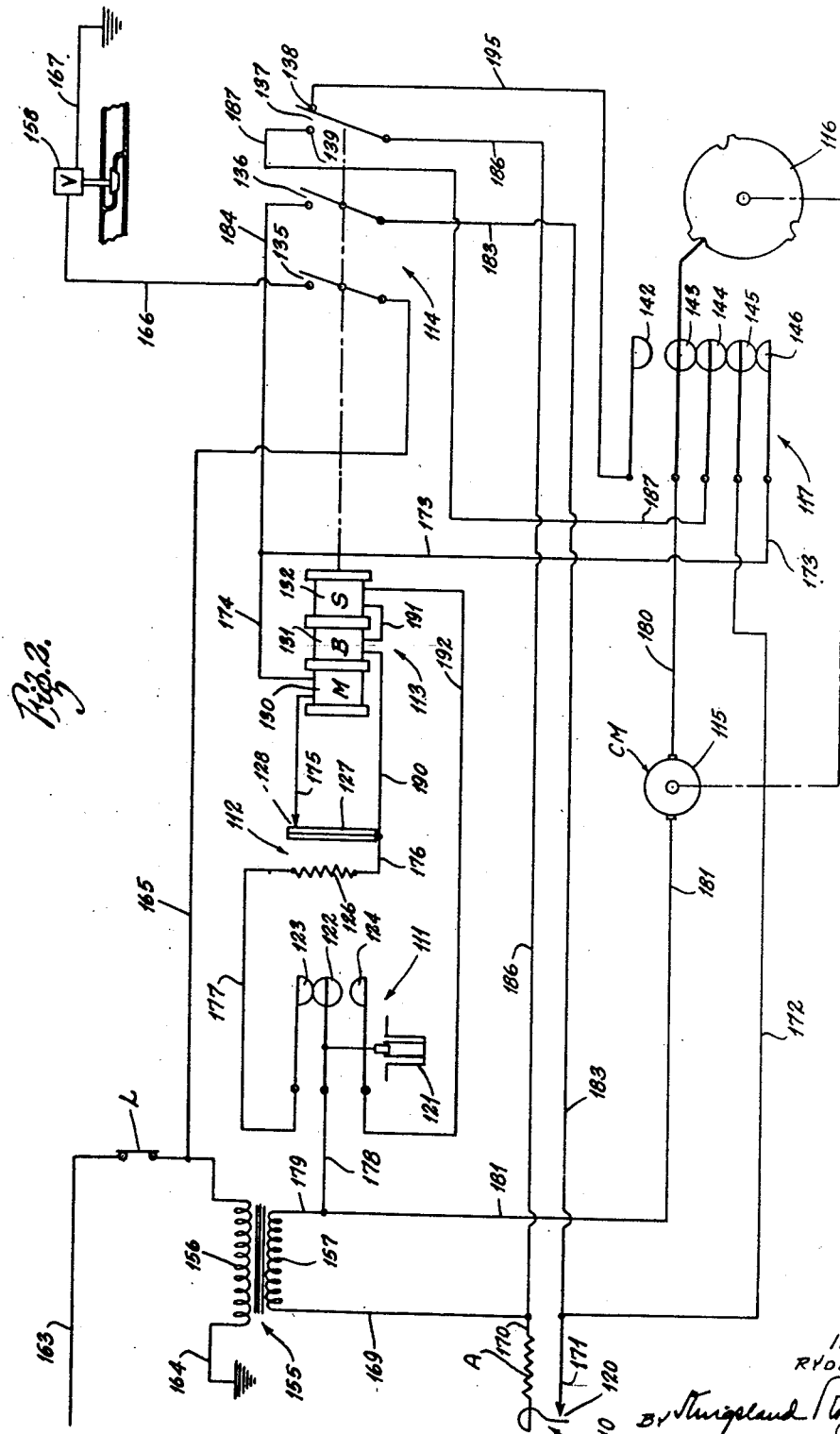

2,501,452

UNITED STATES PATENT OFFICE 2,501,452

TIME-REGULATED BURNER CONTROL SYSTEM

Ryder Pratt, Kirkwood, Mo., assignor, by mesne assignments, to Missouri Automatic Control Corporation, a corporation of Missouri Application July 19, 1945, Serial No. 605,870

25 Claims. (Cl. 158—28)

The present invention relates to a burner control. More particularly, it relates to a burner control providing a cycle wherein the burner operates to supply heat to a space for a fixed, brief period of time after any closure of the room thermostat, no matter how briefly the room thermostat remains closed.

It is an object to provide a control of the foregoing type, providing the short period cycle of operation of the burner, the cycle being of sufficient length to supply the heat losses of the space during ordinary temperature conditions short of extreme conditions.

A further object is to provide the cycle with a scavenging period that is required to be gone through under any circumstances following power failure or flame failure, before a new cycle can be started.

A further object of the invention is to provide a control of this kind wherein it is impossible to restart the control with a hot combustion safety switch; and particularly to provide a control of this kind wherein a bucking coil construction is provided on a main relay, which bucking coil is in circuit when the combustion safety switch is in its hot position, to reduce the power of the relay below that required to pull its switches in.

A further object is to provide a control of this kind wherein a starting current of relatively high value is provided through a circuit including a relay coil, and a running current of lower value is provided, without lowering the magnetic pull of the relay coil below that required to hold the relay switches in.

Further objects will appear from the description to follow.

In the drawings:

Fig. 1 is a wiring diagram of the invention; and

Fig. 2 is a wiring diagram of a change in the control of Fig. 1.

The control in its entirety includes a room thermostat 10, a combustion safety switch, generally indicated at 11, a warp type safety switch, generally indicated at 12, a combination relay, generally indicated at 13, and including a plurality of coils and a group switch 14 operated thereby, a control motor 15, operating a cam means 16, which cam operates a combination switch mechanism 17.

The room thermostat has a single pole, single throw switch 20, which is closed when the room thermostat is cold. Preferably, the room or space thermostat 10 is of the walking type, and has an anticipating heater A in series with it.

The combustion safety switch includes a heat-responsive element 21 adapted to be disposed in a position in a furnace or the like where it will be subjected to the heat of the burner and will detect whether or not the burner is ignited. Preferably, this is of the type disclosed in copending application, Serial No. 588,554, filed April 16, 1945, for Heat-responsive element, by this applicant, and now abandoned or the one in Fillo Patent No. 2,331,464. This element 21 operates a movable contact 22. When the element is cold, the movable contact is in circuit making position with a relatively fixed contact 23. As the heat-responsive element 21 becomes heated, it moves the movable contact 22 downwardly to close with another relatively fixed contact 24, after which, upon continued heating, it separates from the contact 23.

The safety switch 12 includes a heater element 26 and a bimetallic switch blade 27 heated by the heater element. This switch blade is adapted to close with a contact 28 whenever its temperature is below a certain value. When the temperature of the bimetal increases to above that value, the contact 28 is broken.

The relay coils include a main relay coil 30 capable alone of pulling the relay switch group 14 to closed position. The coil also includes a bucking coil 31 wound oppositely to the coil 30, so as to be in opposite phase therewith. The bucking coil opposes the magnetic pull generated by the main coil 30. Additionally, there is another relay coil 32 wound in to accumulate with the main coil 30, and supplementing the same.

The switch group 14 includes, first, a burner device switch 35, closed when the relay is pulled in. It includes, second, a coil holding switch 36, closed when the coil is energized. It includes a double throw switch 37, having a contact 38, closed when the coil is deenergized, and a contact 39, closed when the coil is energized. This last switch closes a scavenging period circuit when released to close the contact 38, and closes a shunting circuit around the room thermostat when the coils is energized to close the contact 39, as will appear. As diagrammatically shown at 40, the last switch 37 is connected to the armature by a lost motion, so that its displacement lags that of the switches 35 and 36, as will appear.

The control motor 15 rotates the cam 16 to operate the switches 17 in a timed order. The latter group of switches include five spring blades, respectively supporting a contact 42, a double contact 43, a double contact 44, a double contact 45, and a single contact 46. These contacts are shown in the position they will occupy when the control is inoperative. Immediately after energization of the control, the contact 43 is displaced upwardly by the cam 16 a first stage, to close with the contact 42. The switch blades, upon which the contacts 44 and 45 are mounted, urge these two contacts upwardly so that they will remain in contact with each other and the contact 43 to hold circuits through the contacts 43, 44 and 45 after the contact 42 is thus closed. However, in this operation, the contact 45 is broken from the contact 46. Later, the contacts 43, 44 and 45 are broken by further elevation of the blade of the contact 43 by an additional cam rise, which leaves only the contacts 42 and 43 together. Then a further movement of the cam will drop the blade 43 and return the switch to starting position. The speed and design of the cam are such that the time from the beginning of the cycle to the opening of the contacts 42, 43 and 44 is approximately three minutes, and that the time from the latter point to the return to starting position is about twenty seconds. As will appear, a hiatus may occur between the two phases of the cycle.

It is not necessary here to illustrate the cams 16 in detail, as it is well known in the art how to design cams that will produce switch operations of the nature required. It may be added that, after the switch has shifted so that the only contacts that are closed are the contacts 42 and 43, the cam must rotate a predetermined distance, for a predetermined interval of time, before it returns the switches to the starting position shown.

The control may be used with a transformer 55, which has a primary winding 56 and a secondary winding 57. The control is adapted to control a burner device, such as the burner motor 58. This burner motor is here shown with a constantly energized igniter 59, although it will be understood that intermittent ignition can be provided if desired. It is also evident that the burner motor is only typical of mechanisms to supply fuel, which include oil and gas valves, and like devices. The igniter may be other than electrical, in which case it would not be connected in the circuit. For example, a gas pilot may be used.

The connections for the control are as follows: A hot power line 63 is brought, through a limit switch L, to one end of the primary 56, and the other end of the primary 56 is connected to ground through a line 64. The line 63 is likewise connected by a line 65 to the blade of the switch 35. The fixed contact of this switch 35 is connected by a line 66 to the burner device 58 and the igniter 59, which are connected by a line 67 to ground.

The secondary 57 is connected by a line 69 to a line 70 that leads through the anticipating heater A to the thermostat 10. The fixed contact of the thermostat switch 20 is connected by a line 71 to a line 72 that leads to the contact 46. The contact 45 of the switch 17 is connected by a line 73 to a line 74 that leads into the main coil 30 of the relay. The other end of this main coil 30 is connected by a line 75 to the warp switch 28. The bimetal 27 of this warp switch is connected by a line 76 to one end of the heater 26. The other end of this heater is connected by a line 77 with the blade of the contact 23 of the combustion safety switch. The contact 22 of the combustion safety switch is connected by a line 78 to a line 79, which, in turn, is connected to the other end of the secondary 57.

The blade holding the switch contact 43 of the switch 17 is connected by a line 80 with the constant speed control motor 15 which operates the cam 16. From this motor, a line 81 leads to the line 79 and back to the secondary 57.

Returning to the line 71 leading from the room thermostat 10, a line 83 leads therefrom to the blade of the switch 36. From the fixed contact of this switch, a line 84 leads into the line 74, which is connected into the main relay coil 30.

Returning to the line 69 leading from the secondary, there is a line 86 connected thereinto at its junction with the line 70. The line 86 leads to the blade of the switch 37. From the fixed contact 39 of the switch 37, a line 87 leads to the blade of the switch contact 44.

The bimetal blade 27 of the safety timing switch 12 is connected also, by a line 90, to the bucking coil 31, the other end of which is connected by a line 91 to be in series with the supplemental main coil 32. The other end of the coil 32 is connected by a line 92 to the relatively fixed contact 24 of the combustion safety switch 11.

The fixed contact 38 of the switch 37 is connected by a line 95 to the contact 42 of the switch 17.

The limit switch L may be located suitably within the circuit, such as in the main power line 63, to open all circuits when the furnace temperature exceeds a given value.

Operation

The control is shown in a position wherein the whole mechanism is inoperative and the room thermostat is in a satisfied condition. Of course, it will be understood that the room thermostat 10 is typical of any control of its general type.

Should the temperature around the room thermostat 10 decrease below its desired value, the switch 20 will close. At such time, the remainder of the controls shown in the drawing will be as thereon indicated. The contact 22 of the combustion safety 11 will be made with the contact 23 and broken from the contact 24. The relay switches will be to the right, as shown in the drawing at 14, and the various switches 17 will be in their positions shown. The limit switch L will be closed.

The closure of the room thermostat establishes a starting circuit from the secondary 57 as follows: The line 69, the line 70, the anticipator A, the thermostat 10, the switch 20, the line 71, the line 72, the contacts 46 and 45, the line 73, the coil 30, the line 75, the switch 28, the switch blade 27, the line 76, the heater 26, the line 77, the contact 23, the contact 22, the line 78, and the line 79 back to the secondary.

At the same time, another parallel circuit is established from the switch 17, owing to the fact that the contacts 43, 44, and 45 are also closed with the contact 46. This circuit leads from the secondary as before, thence through the contact 45, the contact 44 and the contact 43 to the line 80, thence through the control motor 15 and the line 81, back to the line 79.

It will be seen that the foregoing two circuits pull in the relay and start the control motor. They also put the heater 26 of the safety switch 12 in circuit, so that it begins to generate heat that tends to open the switch 28 by its influence upon the bimetal 27.

The energizing of the main relay coil 30 pulls all the switches of the group 14 to the left, closing the switches 35 and 36, and shifting the switch 37 from the contact 38 to the contact 39.

When the switch 35 is closed, it starts the burner device 58 and the igniter from the main power line 63, through the line 65, the switch 35 and the line 66, thence through the burner device and igniter to ground by the line 67. When the burner device starts, with the igniter in operation, combustion is to be expected within a very short period of time.

The closure of the switches 36 and 37 doubly shunts the contact 46 of the cam switches 17, in the starting circuit, by establishing parallel circuits. One extends from the room thermostat through the line 83, the switch 36 and the line 84 to the line 74 leading through the relay coil 30, and finally back to the secondary. This parallel circuit is a supplemental running circuit, operable under conditions to be shown.

Also, as soon as the main relay coil is energized and the relay switches are pulled to the left, the switch 37 is closed to the fixed contact 39. This establishes a parallel circuit that shunts out the room thermostat completely. It starts from the secondary 57, going through the line 69, the line 86, the switch 37 to its energized contact 39, thence by the line 87 back to the contact 44. At this time, the contact 44 is in contact with both the contact 43 and the contact 45. Its closure with the contact 45 continues the foregoing circuit by the line 73 to the line 74, to hold the main relay coil 30 in circuit. The closure of the contact 44 with the contact 43 continues the foregoing circuit around the room thermostat through the line 80 to the control motor, so that the latter remains in operation. It will thus be seen that, as long as the coil 30 remains energized and the control motor switches are in such position that the contacts 43, 44 and 45 are together, both of the foregoing circuits will be held. It will be noticed that they are dependent upon continued power as they require the switch 37 to be moved to its energized position before they are effective, but they are independent of the room thermostat. Thus a momentary contact of the room thermostat starts a cycle of the control.

Immediately after the control motor starts to operate the cam 16, the cam 16 lifts the blade of the contact 43 to close with the contact 42. The contact 43 is, in this operation, followed by the contacts 44 and 45, but the contact 45 breaks away from the contact 46. After the contact 46 is thus broken, the relay coil circuit remains completely dependent upon the continued energization of the main relay coil 30, and its holding circuit through the contact 39 of the switch 37.

After a few seconds in the foregoing condition, combustion will normally have occurred and the combustion switch 11, by means of the heat element 21, will have moved the movable contact 22 against the contact 24. It may be noted that the holding circuit for the main relay coil depends upon the closure of the contacts 22 and 23, so that these are not broken until after the contact 22 closes with the contact 24.

As soon as the contacts 22 and 24 close, the foregoing circuits leading to the line 74 pass through the coil 30 and by the line 75 and the switch 28 through the blade 27. From this blade, there is now established a circuit through the line 90, thence through the buckling coil 31, by the line 91 through the second relay coil 32, and thence by the line 92 to the contact 24, which, being in contact with the other contact 22, continues this circuit through the line 78, the line 79, back to the secondary.

It will be seen that this last-named circuit shunts the heater 26 of the safety switch 12, and finally breaks the circuit thereto. This heater cools thereupon, and, if combustion occurs in the normal period of time, it is taken out of circuit before the bimetal blade 27 has opened the switch 28.

The timing effected by the control motor 15 and its cam 16 is such that the contacts 42, 43, 44 and 45 will be held together for a period sufficiently long to restore room temperature to the required value under normal weather conditions. Usually this period is from two to four minutes. While this particular period of time is variable to suit the particular conditions, it has been found that a period of two minutes operation for a gas burner and a period of three minutes operation for an oil burner are satisfactory. Usually, therefore, at the end of the fixed operating period the room thermostat will be open. Hence, when the cam again shifts the blade holding the contact 43 upwardly in the drawings to separate the contacts 43, 44 and 45, leaving only the contacts 42 and 43 closed, the holding circuit around the room thermostat through the line 86 and the contact 39 of the switch 37, which is dependent upon the contact 44 of the switch 17, will be broken; and there being no circuit held through the room thermostat, the relay coil will release the switches 14 to their deenergized position. This will effect contact of the switch 37 with its contact 38.

It will be noticed that the switch 35 to the burner device 58 is opened when the coil 13 is released. Hence the burner device stops operation. When the contact 38 of the switch 37 is closed, there remains in circuit only the control motor, which is energized from the secondary 57 through the line 69, the line 86, the switch 37, its contact 38, the contacts 42 and 43, the line 80, the control motor, and the lines 81 and 79 back to the secondary. The control motor alone will then operate for a predetermined interval proper to scavenge the furnace. Thereafter, the cam 16 will release the switch 17 back to its starting position, as shown in the drawings.

The foregoing is a normal cycle of operation for all ordinary heat conditions. It is predicated upon the fact that a relatively short period of burner operation is sufficient to satisfy the thermostat, and that variations in weather within the range will be accommodated for by more frequent fixed periods of burner operation, rather than by less frequent, longer cycles, with their tendency to produce overrides of the desired upper and lower room temperatures established by the thermostat 10. This fixed period of operation occurs whenever the thermostat closes momentarily sufficiently to pull up the relay, which then is locked through its own circuit, until it is opened by the control motor, a few minutes later.

No recycling can occur until after a scavenging period has been added to any partial or whole cycle once commenced by the control motor 15.

If the room thermostat again closes at the end of a complete cycle, including the scavenging period, or indeed during the scavenging period, the control will recycle in the same manner as before.

Where the temperature conditions are more severe than those normally encountered, the room thermostat may not be satisfied at the end of the fixed period of two to four minutes. It will be remembered that two holding circuits have already been described that effect holding of the relay switches in, even though the initial starting circuit through the contacts 45 and 46 has been opened. These two circuits are, first, the one through the room thermostat, the line 83, and the switch 36, and, second, the one previously described in detail through the line 86 and the contact 39 of the switch 37.

If the room thermostat remains closed at the end of a fixed timing period, then the former of these two circuits, through the room thermostat, the line 83 and the holding switch 36, will remain closed at the time the various contacts 43, 44 and 45 are all separated from each other at the end of the two to four minute interval. This holding circuit passes from the switch 36 through the line 84, the line 74 to the main coil 30, thence through the line 75, the contact 28, the bimetal 27, the line 90, the bucking coil 31, the line 91, the supplemental main coil 32, the line 92, the contact 24, the contact 22 of the switch 11, the lines 78 and 79, back to the secondary. There is no parasitic circuit at this time from the line 84 through the line 73, because the contact 45 is open. Also, the contact 43 is open, so that there is no circuit at all through the control motor which remains stopped, although the coil will be energized and the burner device switch 35 consequently closed. In other words, this holding circuit through the switch 36 is dependent wholly upon a continued demand at the room thermostat 10. It will remain closed so long as the demand continues. Whenever the room thermostat is satisfied, the circuit is immediately broken and the relay drops out. Thereupon, as the contacts 42 and 43 of the switch 17 are closed, the scavenging period will begin. The control motor will run until the end of the scavenging period and return the control to its starting position.

It will be thus observed that this control handles normal temperature conditions by periods of fixed duration of operation of the burner device. It handles abnormal temperature conditions by keeping the burner device in operation for the full interval of time in which there is a demand for heat at the room thermostat. It is capable of performing these functions with a walking (or non-snap-acting) type of thermostat, which thereby may operate within a very close differential. The chattering attendant upon operation of a control of the ordinary type by a thermostat of the walking type, or one with zero to very small differential, is avoided by the present control.

It will also be seen that anticipation of the room thermostat is produced only when needed. As soon as the room thermostat makes its initial contact, it locks up the relay through the shunting circuit around the room thermostat, and, therefore, for all practical purposes, deenergizes the anticipator. However, should there be a demand for heat beyond the fixed period of the control motor, the room thermostat will return to control the circuit and anticipation will be produced.

Combustion normally occurs within a very short period of time after the burner motor is energized. The stack or combustion safety switch 21 is preferably of the rate-of-change type that responds within a few seconds to the existence of flame. Hence the heater 26 of the safety switch 12 is ordinarily taken out of circuit after a few seconds of the initial operation. If, however, combustion does not occur within a predetermined time, the combustion safety 11 will not separate the contacts 22 and 23. Consequently, the heater 26 will continue to generate heat, and, after a fixed period of time, such as one minute, will open the bimetal 27 from the contact 28. As all circuits through the relay coils must go through the switch 28, the relay will necessarily drop out. Thereupon, the switch 37 will make with its contact 38. It will be remembered that the contacts 42 and 43 are closed together immediately after the start of the control motor 15. Hence, the scavenging circuit will be established as soon as the coils are released, and the clock motor will operate throughout the entire remainder of its cycle until it returns the control to starting position. The switch 12 may be a switch requiring manual reset, in which event the control cannot start up again until the bimetal 27 is manually returned to closed position. If, however, it is not a manual reset switch, it will close as soon as the bimetal 27 cools off, and, when the control motor returns the cam to starting position, the control will make a new effort at a proper start. The switch 12 may be one that will make a partial trip each complete cycle for two or three cycles, and then finally trip out, requiring manual reset. Such switches are known in the art.

In the event of power failure at any time after the contact 46 is opened, which is to say at any time after the first two or three seconds of operation of the control motor, the coil will be deenergized and release all of the switches 14. Upon return of power, the coil cannot be reenergized, unless the combustion switch 11 is in cold position. If the combustion switch is in cold position, indicating absence of combustion, the control will try again to start. A circuit will be established from the secondary, through the line 69, the line 86, the switch 37, the contact 38, the line 95 to the contact 43. During the prescribed running period, the contacts 42, 43, 44 and 45 are closed. Hence, during such period, the foregoing circuit will be continued through the control motor 15 via the contact 43, and through the relay via the contacts 44 and 45, and the line 73, to cause the relay to pull in again, and again establish combustion conditions, with both the safety switch 12 and the combustion switch 11 in operative control.

If the power failure occurs after the combustion switch has moved to hot position, the foregoing circuit to the coil 30 will have the bucking coil 31 in it. It, therefore, cannot effect reclosure of the relay switches. However, the control motor will operate to return the control to starting position. If the combustion switch 11 should return to the cold side before the control motor opens the switches 43, 44, and 45, the relay may pull in again, but the safety switch heater 26 will become energized to insure proper combustion.

To enable the relay to pull in under these circumstances regardless of opening of the room thermostat, the switch 37 is operated with a lost motion 40, that permits the switches 35 and 36 to be closed whenever the coil is energized through the circuit including the contact 38, before the power of the relay is lost by its own opening of this contact. After the switches 35 and 36 close, the switch 37 moves from the contact 38 to the contact 39.

It is, of course, evident that the circuit to reenergize the relay will be broken at the end of the cam-defined running period, because the cam opens the contacts 44 and 45. Thereafter the scavenging circuit remains. The foregoing abnormal cycles are established because the contacts 43 and 42 are closed just before the contacts 46 and 45 are opened.

In the event of flame failure, at the burner, the combustion safety device 21 will cool down. If it is of the rate-of-change type, the cooling operation will occur within a few seconds. This will shift the contact 22 from the contact 24 to the contact 23. However, the contact 22 does not break with the contact 24 until after it has made with the contact 23. The main coil 30 will thereby be returned to control of the relay, but the heater 26 will be thrown back into circuit, and will, in a predetermined period of time, open the switch 28, thereby releasing the main coil and running the control motor through its scavenging period. If the room thermostat is closed at the end of the scavenging period, the control motor will continue operation. The relay, however, will not pull in unless or until the safety switch 28 cools and recloses.

If, for any reason, the combustion switch 11 is in its hot position, with the contacts 22 and 24 closed, at the time the control is otherwise in condition to draw in the relay switches, the bucking coil 31 will prevent the relay from pulling in until the combustion switch is shifted to its cold position, with the contacts 22 and 23 closed and the contact 24 open.

It will be noticed that all circuits to the relay coil run from the line 74 through the main coil 30, and thence through the bimetal switch 28 and the bimetal 27. When the combustion safety is in its hot position, the circuit is continued through the line 90 and the coils 31 and 32 in series. The bucking coil 31 is wound oppositely to the main coil 30 and the supplemental coil 32, or connected in circuit so that the current goes through it in an opposite direction. It produces a countermagnetic flux of sufficient amount to render the two coils 30 and 32 insufficient to pull the relay in. However, the reduction of the magnetic force is not sufficient to effect a release of the relay switches if they have already been pulled in by the main coil 30 alone.

As described in somewhat greater detail in this applicant's copending application, Serial No. 605,863, filed concurrently herewith, and now Patent No. 2,486,612, granted November 1, 1949, the design of the coils 30, 31 and 32 must satisfy the following conditions: The coil 30 alone must produce enough force to pull the switches in. The three coils in series must produce sufficient force to hold the relay switches in once they are pulled in, even at a low voltage such as 85 volts, but not enough to pull the switches in, even at an excessive voltage such as 135 volts. The overall circuit through the coil 30 and the heater 26 must allow passage of sufficient current to cause the heater 26 to open the switch 28 within a fixed period of time, such as two minutes as a maximum, at normal voltage. It must provide sufficient current to operate the switch 12 at minimum voltage, such as 85 volts, within a somewhat longer time, such as five minutes. The transformer 55 must not be made to carry a high current for a long period of time. In other words, while the current may be high during the interval of energization of the heater 26, it must be reduced at the time the two coils 31 and 32 are put in circuit, because this running period continues for a relatively long period of time. A further limitation is that the control provide enough current through the heater 26 to open the switch, even when the combustion safety 11 is short-circuited.

Under the foregoing limitations, a control may be designed with a main coil 30 of certain impedance as well as power, and a safety switch 12 having a certain amount or rate of heat generation in its heater 26. The provisions are that the coil 30 shall pull the switches in alone at voltages from 135 down to 90, and that the heater 26 generate enough heat to open the switch 28 at normal voltage within a period of about two minutes and at the low voltage of about 90 within a period of five minutes.

Then, in order to reduce the power of the coil 30 at the time the combustion safety 11 changes to the hot side, the bucking coil 31 is added. When this circuit comes into action, it is necessary to reduce the current passing through the transformer to some value that will be within the operating range of the latter, and which is normally lower than that carried during the starting interval. If a bucking coil alone were added without any other provision for current control, the result would be an increase in current carried through the running circuit, because the presence of the bucking coil reduces the net impedance of the circuit through both it and the main coil 30.

The applicant has found that, if a supplement, such as the coil 32, be added to the main coil along with the bucking coil, the satisfactory conditions required are obtained. The total impedance of the circuit may be made sufficiently high to reduce the current to a value within the range of the transformer. The net reduction in magnetic pull of the coils will be sufficient to hold the switches closed, but insufficient to pull them in through the complete voltage range. The current that will pass through the heater 26 when the combustion switch 11 is short circuited, i. e., the contact 22 is closed with both the contacts 23 and 24, will be sufficient to open the switch 28 within the required time interval, for example, within five minutes.

It may be commented that the use of the coil arrangement, hereinbefore described, is greatly superior to a substitution of a resistor for the supplemental coil 32. A resistor sufficiently large to lower the current to the desired range of the transformer would reduce the power of the coils below that necessary to hold the switches in.

Under the foregoing circumstances, the shorting of the combustion switch 11, so that both the starting circuit, through the heater 26, and the running circuit, through the bucking coil, are in parallel, will still provide sufficient current through the resistor 26 to cause the switch 28 to open within a reasonable time.

It will be seen, however, that the design of the control is such that it is safe under all condition of flame failure, power failure, ignition failure, or a combination of them. Also, failure of the control motor, as by a blocking of its revolution, cannot produce an unsafe condition. If this occurs during the starting period, with the contacts 42, 43, 44 and 45 closed, the control will nevertheless operate as previously described to produce a normal cycle or an abnormal one until the limit switch L opens. This will drop the relay switches out. The relays can then be pulled in only after the combustion switch 11 returns to cold position, because of the bucking coil. Thereafter, the burner would operate on the limit switch until repaired. Power failure, accompanied by control motor block, would operate the same way to produce a safe condition, as power failure during the corresponding period of normal clock motor operation.

Fig. 2 shows a modified form of control operating on principles similar to those of Fig. 1. For convenience, corresponding parts are designated by corresponding reference numbers plus 100.

This control has the same room thermostat 110, a combustion safety switch 111, a safety shutoff 112, a relay 113, relay operated switches 114, a timing motor 115, cam means 116 rotated by the cam or control motor, and cam switches 117 displaced by the cam 116.

The room thermostat 110 operates a room thermostat switch 120, and also has the anticipating heater A in series therewith. The combustion safety switch 111 has preferably a tube and tube element 121 of the type shown in the copending application referred to or in the Fillo patent. The heating element 121 operates a contact 122 which is closed with a relatively fixed contact 123 when the combustion switch is closed, but is drawn downwardly, in Fig. 3, to close with a contact 124 when the combustion switch element 121 heats, and, upon continued heating thereof, to break with the contact 123 after making with the contact 124.

The safety switch 112 includes a heater 126 and a bimetal 127, the latter making a switch 128, the same as in Fig. 1.

The relay 113 includes the main relay coil 130, the bucking coil 131, and the supplemental coil 132, wound in the same direction as the coil 130.

The relay switch 114 is the same as before. It comprises a first switch 135, a second switch 136, both closed when the relay coils are energized, and a third switch 137 closed with a contact 138 when the relay is deenergized and closed with the contact 139 when the relay is energized.

The cam switches 117 in this case are the same as before, including a switch contact 142, and similar switch contacts 143, 144, 145 and 146. As will appear, there is a change in the connection of these switches, however.

There is a transformer 155, having a primary 156 and a secondary 157. In the control of Fig. 2, the burner device is shown as a magnetic valve 158, controlling the flow of fuel to a burner.

In this control of Fig. 2, the connections include a main power line 163 running through the limit switch L, and thence into the primary 156 which is connected by a line 164 to ground. Another line 165 from the hot line 163 leads to the blade of the switch 135, so that it may be connected by a line 166 through the valve 158 and thence by a line 167 to ground.

The secondary 157 is connected by a line 169 to a line 170 that leads through the anticipator A to the thermostat 110. From the switch 120 of the thermostat, a line 171 is connected with a line 172 that, in this case, is connected with the switch contact 145 of the cam switches 117. The cam switch contact 146 is connected by a line 173 that is connected into a line 174 leading through the main relay coil 130, which is connected thereafter by a line 175 into the bimetal 127. It will be noted that this control differs over that of Fig. 1 in that the connections for the contacts 145 and 146 of the cam switches 117 are reversed. The functions of this reversal will appear hereafter.

Returning to the circuit previously begun, the bimetal 127 is connected by a line 176 into the heater 126 of the safety 112, the other end of which is connected by a line 177 to the upper contact 123 of the combustion safety switch 111. The contact 122 of the latter switch is connected by a line 178 into a line 179 leading to the secondary 157.

Returning to the cam switches 117, the contact 143 thereof is connected by a line 180 into the control motor 115, the other side of which is connected by a line 181 to the line 179.

Returning to the room thermostat switch 120, the line 171 thereof is connected by a line 183 into the blade of the switch 136. The fixed contact of this switch is connected by a line 184 to the line 174.

Returning to the line 169, a line 186 is connected to this line 169 and leads to the blade of the switch 137. The energized contact 139 of this switch is connected by a line 187 to the contact 144 of the cam switches 117.

The hot contact 124 of the combustion safety 111 is connected into circuit as follows: From the bimetal 127, a line 190 is connected through the bucking coil 131 and the supplemental coil 132. The other end of this latter coil is connected by a line 192 with the contact 124 of the combustion safety switch.

The deenergized contact 138 of the relay switch 137 is connected by a line 195 to the contact 142 of the cam switches 117.

*Operation of Fig. 2*

The operation of the control of Fig. 2 is similar to that of Fig. 1, but it possesses certain important differences. When the room thermostat switch 120 closes, a circuit to start the control motor and pull in the relay is established. This circuit passes from the secondary 157 through the line 169, the anticipating heater A, the switch 120, the line 171, the line 172, the contact 145, the contact 146, the line 173, the line 174, the main relay coil 130, the line 175, the switch 128, the bimetal 127, the line 176, the heater 126, the line 177, the combustion safety cold contacts 123 and 122, the line 178, and the line 179 back to the secondary. The coil 130 is of sufficient power under these circumstances to pull the relay switches closed.

At the same time, another circuit is established to the control motor 115 from the contact 145. This circuit includes the contacts 145, 144 and 143, which are closed at the start, the line 180, the motor 115, the line 181 back to the secondary.

Immediately after the control motor starts in operation, it shifts the blade 143 upwardly to close with the contact 142. The cam rise is sufficient to do this, and the contacts 144 and 145 are spring-urged to follow the contact 143 until it thus closes with the contact 142. The contact 146, however, is broken from the contact 145 immediately thereafter. As a result, the starting circuit is completely opened. However, upon closing of the relay, a shunt circuit around the room thermostat is closed to hold the relays closed, regardless of the possible reopening of the room thermostat immediately thereafter. This holding circuit differs somewhat from the one in the preceding figure. It is as follows: From the secondary 157 through the line 169, the line 186, the switch 137, its energized contact 139, the line 187, the contact 144, the contact 145, the line 172, the line 183, the holding switch 136, the line 184, the main relay coil 130, and thence back through the circuit to the secondary. This circuit, therefore, depends upon holding the relay closed as to both of its switches 136 and 137, which are, of course, closed at the same time. It, however, is independent of the room thermostat. It does depend upon the cam switches 144 and 145 being in closed position.

When the relays are closed, the switch 135 is closed, and, therefore, the gas valve 158 is opened, as will be understood.

In the foregoing circuits, the heater 126 of the safety switch 112 is energized. The current to energize it is relatively high because the main coil 130 has a low impedance. If combustion does not occur in a period of, for example, one minute, the heater will open the switch 128 by its influence on the bimetal 127. However, combustion is normally expected to occur within this period, and combustion rapidly moves the combustion safety 111 because of the quick response of the tube and tube member 121. This operation is the same as in the preceding figure. As the element 121 heats, it draws the contact 122 down, the contact 123 following until the contact 122 closes with the contact 124. Thereafter, continued heating of the element in its normal manner will break the contacts 122 and 123. However, the circuit is then established through the contact 124 to hold the main relay coil 130 in circuit. This circuit goes from the bimetal 127 through the line 190, the bucking coil 131, the supplemental coil 132, and the line 192, the contacts 124 and 122, the line 178 back to the secondary.

A function of the coil 132 is to add impedance to the holding circuit, without reducing the power of the magnet below that required to hold the switches in. This coil adds so much impedance to the circuit that the current through the circuit is much reduced. Hence, the transformer is not required to carry the high starting current more than for a brief time. If the current were reduced to this point, without the addition of more turns on the relay, the relay would not have sufficient power to hold the switches in. Hence, this coil adds turns to the relay coil, while reducing amperes. The net result is, when all three coils are in, the relay has sufficient power to hold the switches in.

After a period of three minutes, for example, during which the burner will be in operation, the control motor shifts the cam 116 further, so that the contacts 144 and 145 are broken from the contact 143 and from each other. The operation elevates the contact 143 further, so that it remains closed with the contact 142.

The breaking of the contacts 144 and 145 eliminates all of the relay holding circuits. The only circuit then closed is that running through the line 186, the switch 138, the line 195, the contacts 142 and 143, the line 180, the control motor 115, the line 181, back to the secondary. The control motor will thereby cycle through its full period to return to starting position. This circuit will be closed whenever a power failure occurs to release the magnetic coil switches 114, as the contacts 143 and 142 are closed immediately after the beginning of the cycle.

It will, of course, be understood that, when the heater 126 is left in circuit so long that the bimetal 127 opens the switch 128, the relays will drop out, because all of the relay circuits depend upon closure of the switch 128. This acts the same as the power failure, and always occurs after the switch 137 is closed with its contact 138. Therefore, the control will cycle out to its starting position once again. If the switch 128 is a manual reset switch, it will have to be manually reset before a new cycle can begin. If it is not a manual reset, the control will try once again to establish proper burner conditions.

Of course, the heater 126 is taken out of circuit when proper combustion occurs and the element 121 is heated in response thereto to shift the contact 122.

As it is desirable to have the combustion safety switch 111 packaged separately from the rest of the control, it must be externally wired to the control. A short-circuiting of these wires will put the circuit through the heater 126 in parallel with the circuit through the bucking coil 131 and the supplemental coil 132. This is the situation that actually exists momentarily during the shift of the combustion safety 111. The coils 131 and 132 have sufficient impedance so that adequate current will pass through the heater 126 to cause it to open within a reasonable period of time, so that a safe situation will result.

As in the control of Fig. 1, the continued demand for heat at the room thermostat 110, after the end of the normal running period, will hold the relays closed through the circuit, including the room thermostat, the line 183, the switch 136 and the line 184. As soon as the room thermostat is satisfied and this circuit is opened, the relays will drop out and a scavenging period will follow, at the end of which the control will return to its starting position.

In the control of Fig. 2, any release of the relay, after the switch contact 146 is broken, will prevent its reenergization until the control returns to starting position, as all other circuits are held through the relay switches. Thus a momentary power failure and restoration, a failure of combustion, a blocking of the control motor, or an operation on the limit switch, all break the relay holding circuits, and the control may recycle only after it operates through the scavenging period. If any control element in the relay circuit remains open at the return to starting position, and the room thermostat is closed, the only circuit to be established will be that to the control motor, which will recycle through the contact 146 or the contact 142, as they successively close. Even a reclosure of an opened relay circuit element after the switch 146 opens will not close a relay circuit, in this control, until the control motor returns the cam switches to starting position.

The control of Fig. 2 is thus preferable in many installations to that of Fig. 1. As it is essential to prevent it from pulling in the relay at the start of a cycle with the combustion switch 122, 124 in circuit, the bucking coil 131 of Fig. 2 is employed in series with the supplemental coil 132.

What is claimed is:

1. In a control for a heat-change producing device under regulation of a space thermostat, the control having a terminal for connection with the thermostat, whereby the terminal may be energized under regulation of the thermostat, a combustion safety thermostat movable from first to second position in response to existence of predetermined ambient temperature conditions, a timing motor and timing switch means operated thereby, a relay including relay coil means and relay switch means, a second timing means including a cut-off switch and switch operating means adapted to open the switch after energization of the switch operating means for a predetermined time, said relay switch means being adapted to control operation of the heat-change device, means to operate the timing motor responsive to energization of the space thermostat terminal, means to hold the timing motor in operation, circuit means to energize the relay coil means upon starting of the timing motor and to energize the cut-off switch operating means at the same time, means to deenergize the latter in response to operation of the safety thermostat from first to second position, and additional circuit means for the relay coil means adapted to be energized by the safety thermostat in second position.

2. In a control for a heat-change producing device under regulation of a space thermostat, the control having a terminal for connection with the thermostat, whereby the terminal may be energized under regulation of the thermostat, a combustion safety thermostat movable from first to second position in response to existence of predetermined ambient temperature conditions, a timing motor and timing switch means operated thereby, a relay including relay coil means and relay switch means, a second timing means including a cut-off switch and switch operating means adapted to open the switch after energization of the switch operating means for a predetermined time, said relay switch means being adapted to control operation of the heat-change device, means to operate the timing motor responsive to energization of the space thermostat terminal, means to hold the timing motor in operation, circuit means to energize the relay coil means upon starting of the timing motor, and to energize the cut-off switch operating means at the same time, means to deenergize the latter in response to operation of the safety thermostat from first to second position, and additional circuit means for the relay coil means adapted to be energized by the safety thermostat in second position, said safety thermostat being adapted to energize said additional circuit means before deenergizing said first-named circuit means.

3. In a control for a heat-change producing device under regulation of a space thermostat, the control having a terminal for connection with the thermostat, whereby the terminal may be energized under regulation of the thermostat, a combustion safety thermostat movable from first to second position in response to existence of predetermined ambient temperature conditions, a timing motor and timing switch means operated thereby, a relay including relay coil means and relay switch means, a second timing means including a cut-off switch and switch operating means adapted to open the switch after energization of the switch operating means for a predetermined time, said relay switch means being adapted to control operation of the heat-change device, means to operate the timing motor responsive to energization of the space thermostat terminal, means to hold the timing motor in operation, circuit means to energize the relay coil means upon starting of the timing motor, and to energize the cut-off switch operating means at the same time, means to deenergize the latter in response to operation of the safety thermostat from first to second position, additional circuit means for the relay coil means adapted to be energized by the safety thermostat in second position, and means to render the timing motor holding means ineffective after a predetermined period of its operation.

4. In a control for a heat-change producing device under regulation of a space thermostat, the control having a terminal for connection with the thermostat, whereby the terminal may be energized under regulation of the thermostat, a combustion safety thermostat movable from first to second position in response to existence of predetermined ambient temperature conditions, a timing motor and timing switch means operated thereby, a relay including relay coil means and relay switch means, a second timing means including a cut-off switch and switch operating means adapted to open the switch after energization of the switch operating means for a predetermined time, said relay switch means being adapted to control operation of the heat-change device, means to operate the timing motor responsive to energization of the space thermostat terminal, means to hold the timing motor in operation, circuit means to energize the relay coil means upon starting of the timing motor, and to energize the cut-off switch operating means at the same time, means to deenergize the latter in response to operation of the safety thermostat from first to second position, and additional circuit means for the relay coil means adapted to be energized by the safety thermostat in second position, said additional circuit means including power reducing means to render the coil means capable only of holding its switch means, but incapable of pulling them in.

5. In a control for a heat-change producing device under regulation of a space thermostat, the control having a terminal for connection with the thermostat, whereby the terminal may be energized under regulation of the thermostat, a combustion safety thermostat movable from first to second position in response to existence of predetermined ambient temperature conditions, a timing motor and timing switch means operated thereby, a relay including relay coil means and relay switch means, a second timing means including a cut-off switch and switch operating means adapted to open the switch after energization of the switch operating means for a predetermined time, said relay switch means being adapted to control operation of the heat-change device, means to operate the timing motor responsive to energization of the space thermostat terminal, means to hold the timing motor in operation, circuit means to energize the relay coil means upon starting of the timing motor, and to energize the cut-off switch operating means at the same time, means to deenergize the latter in response to operation of the safety thermostat from first to second position, and additional circuit means for the relay coil means adapted to be energized by the safety thermostat in second position, said additional circuit means including power reducing means in the form of a bucking coil to render the coil means capable only of holding its switch means, but incapable of pulling them in.

6. In a control for a heat-change producing device under regulation of a space thermostat, the control having a terminal for connection with the thermostat, whereby the terminal may be energized under regulation of the thermostat, a combustion safety thermostat movable from first to second position in response to existence of predetermined ambient temperature conditions, a timing motor and timing switch means operated thereby, a relay including relay coil means and relay switch means, a second timing means including a cut-off switch and switch operating means adapted to open the switch after energization of the switch operating means for a predetermined time, said relay switch means being adapted to control operation of the heat-change device, means to operate the timing motor responsive to energization of the space thermostat terminal, means to hold the timing motor in operation, circuit means to energize the relay coil means upon starting of the timing motor, and to energize the cut-off switch operating means at the same time, means to deenergize the latter in response to operation of the safety thermostat first connected to one thermostat terminal, and also connected to one relay switch, the second thermostat terminal being connected to a timer switch means, a second relay switch having terminal means for connection with the burner device whereby the latter may be energized when said switch is operated, said first timer switch means being connected with the relay coil whereby the coil may be energized under control thereof, said first timer switch means being also interconnected with the second timer switch means, and the latter being connected with the timer operating means whereby the latter may be energized under control of said two timer switch means, third timer switch means connected from said first relay switch means and interconnected with said second timer switch means, whereby when said one relay switch is closed the first power terminal is connected therethrough and through said second and third timer switch means to the relay coil and the timer operating means, a first coil terminal for connection with the cold side of the combustion switch, a second coil terminal, power reducing means for the relay coil to render it only capable of holding the relay switches operated, said second coil terminal being connected with the first coil terminal through said power reducing means, said timer being adapted to open said timer switch means after a predetermined time, additional timer switch means closed thereby, and connected with the first relay switch when the same is released from operation, said additional timer switch means being connected with the timer operating means to cause operation of the same and return the timer to starting condition while the burner relay switch is open.

13. In a control for use with a burner device, a space thermostat, and a combustion safety switch having a switch blade movable from cold to hot contacts, the control having a timer with a timer operating means and a plurality of switch means operated thereby in timed order, a relay having a coil and a plurality of relay switches, thermostat terminals in the control for connection through the thermostat, power terminals, the first connected to one thermostat terminal, and also connected to one relay switch, the second thermostat terminal being connected to a timer switch means, a second relay switch having terminal means for connection with the burner device whereby the latter may be energized when said switch is operated, said first timer switch means being connected with the relay coil whereby the coil may be energized under control thereof, said first timer switch means being also interconnected with the second timer switch means, and the latter being connected with the timer operating means whereby the latter may be energized under control of said two timer switch means, third timer switch means connected from said first relay switch means and interconnected with said second timer switch means, whereby when said one relay switch is closed the first power terminal is connected therethrough and through said second and third timer switch means to the relay coil and the timer operating means, a first coil terminal for connection with the cold side of the combustion switch, a second coil terminal, power reducing means for the relay coil to render it only capable of holding the relay switches operated, said second coil terminal being connected with the first coil terminal through said power reducing means, said timer being adapted to open said timer switch means after a predetermined time, additional timer switch means closed thereby, and connected with the first relay switch when the same is released from operation, said additional timer switch means being connected with the timer operating means to cause operation of the same and return the timer to starting condition while the burner relay switch is open, said second thermostat terminal being also connected to an additional relay switch, the other side of which is connected to the relay coil, whereby when said thermostat terminal is energized, the relay coil may be held after said first named timer switch means are opened.

14. In a control for use with electric power lines, a burner device or the like, a space thermostat adapted to close two terminals together, and a combustion-responsive switch adapted to connect with a cold-side terminal and with a hot-side terminal in response to ambient temperature conditions; the combination of a pair of power terminals adapted to be connected with power lines, terminals for the thermostat aforesaid, the first of which is connected with the first of the power terminals, hot-side and cold-side terminals for the combustion switch aforesaid, a timer, a plurality of switch means operated thereby in a predetermined sequence, a relay having coil means and relay switch means, a starting circuit branch for the timer connected from the second thermostat terminal through the timer switch means and the timer to the second power terminal; a circuit branch for the relay coil means from the second thermostat terminal and the timer switch means through the coil means to the second power terminal, a first holding circuit branch for the relay and timer from the first power terminal through the relay switch means and the timer switch means to the timer and the relay coil means, the same being independent of connection between the first and second thermostat terminals, a second holding circuit from the second thermostat terminal through the relay switch means and the relay coil means, a control switch in the relay switch means adapted to be connected in a burner device operating circuit, the timer having means to open the timer switch means in the starting circuit after a time permitting the relay coil means to become energized and having means to hold the first holding circuit and the control switch closed for a time period to enable the burner switch to remain closed for a predetermined period of time and then release control of the same to the second holding circuit; means energizable to prevent the control switch from reclosing, and a circuit branch therefor connecting said means in series between the hot-side and cold-side terminals aforesaid.

15. The combination of claim 14 together with means for preventing reenergization of the starting circuit branch for a period after the second holding circuit is opened and the control switch is released.

16. In a control for use with a burner device, a combustion switch operable to cold and hot positions, a space thermostat switch, means including a switch adapted to be connected with the burner device and time-regulated means controlling closure of said switch for a predetermined time whereby it may establish a fixed period for operation of the burner device during which predetermined heat losses from the space may be supplied, said time-regulated means including mechanism operated for the duration of said period in refrom first to second position, and additional circuit means for the relay coil means adapted to be energized by the safety thermostat in second position, said additional circuit means including power reducing means comprising a bucking coil and a coil supplemental to said first-named coil means to render the coil means capable only of holding its switch means, but incapable of pulling them in, and to control the current through the circuit.

7. A control comprising a timing motor and a plurality of switches operated thereby, a relay including a main coil and a plurality of switches operated thereby, a bucking coil disposed to oppose the field of the main coil, the timing motor being connected in series with a first one of the timing motor switches, the main relay coil being also connected in series with said switch, said switch being closed at the start of the timing motor and opened promptly thereafter, said timing motor and main relay coil also being connected in series with a first of the relay switches and a second of the timing motor switches, whereby they may be energized when the relay is closed, said timing motor having means constructed to hold the second timing motor switch closed for a predetermined time and then to open it, a circuit through the bucking coil interconnected with the main coil to reduce the power of the main coil to prevent it from being able to pull in the switches, but yet to be able to hold them in, and a second of the relay switches being adapted to regulate operation of a device to be regulated by the control.

8. A control comprising a timing motor and a plurality of switches operated thereby, a relay including a main coil and a plurality of switches operated thereby, a bucking coil disposed to oppose the field of the main coil, the timing motor being connected in series with a first one of the timing motor switches, the main relay coil being also connected in series with said switch, said switch being closed at the start of the timing motor and opened promptly thereafter, said timing motor and main relay coil also being connected in series with a first one of the relay switches and a second of the timing motor switches, whereby they may be energized when the relay is closed, said timing motor having means constructed to hold the second timing motor switch closed for a predetermined time and then to open it, a circuit through the bucking coil interconnected with the main coil to reduce the power of the main coil to prevent it from being able to pull in the switches, but yet to be able to hold them in, one of said relay switches being closed when the relay is deenergized and connected in series with a third of the timing motor switches to the timing motor, said timing motor having means constructed to close said third switch after the timing motor starts and to open the same following an interval after opening of the second timing motor switch.

9. A control comprising a timing motor and a plurality of switches operated thereby, a relay including a main coil and a plurality of switches operated thereby, a bucking coil disposed to oppose the field of the main coil, the timing motor being connected in series with a first one of the timing motor switches, the main relay coil being also connected in series with said switch, said switch being closed at the start of the timing motor and opened promptly thereafter, said timing motor and main relay coil also being connected in series with a first one of the relay switches and a second one of the timing motor switches, whereby they may be energized when the relay is closed, said timing motor having means constructed to hold the second timing motor switch closed for a predetermined time and then to open it, a circuit through the bucking coil interconnected with the main coil to reduce the power of the main coil to prevent it from being able to pull in the switches but yet to be able to hold them in, said bucking coil circuit being connected in series with the main coil circuit, but having a separate terminal.

10. A control comprising a timing motor and a plurality of switches operated thereby, a relay including a main coil and a plurality of switches operated thereby, a bucking coil disposed to oppose the field of the main coil, the timing motor being connected in series with a first one of the timing motor switches, the main relay coil being also connected in series with said switch, said switch being closed at the start of the timing motor and opened promptly thereafter, said timing motor and main relay coil also being connected in series with one of the relay switches and a second one of the timing motor switches, whereby they may be energized when the relay is closed, said timing motor having means constructed to hold the second timing motor switch closed for a predetermined time and then to open it, a circuit through the bucking coil interconnected with the main coil to reduce the power of the main coil to prevent it from being able to pull in the switches but yet to be able to hold them in, and a supplemental main coil connected in series with the bucking coil, the coil being adapted to reduce the current through the circuit without reducing the power of the relay below that required to hold the relay switches.

11. A control comprising a timing motor having timing means and a plurality of switches operated in timed order thereby, a relay comprising a coil and relay switch means, a safety shut-off comprising a timed electrical operating means and a cut-off switch, the timing motor and the relay coil being connected in series with a first one of the timing motor switches, whereby both may be energized when the timing motor switch is closed, said coil also being connected in series with the safety shut-off operating means and switch and a terminal, to energize the operating means, a first one of the relay switch means connected in series with a second one of the timing switches with the timing means and the relay coil, said timing means being constructed to open the first timing switch promptly after starting and to close the second and hold it closed for a predetermined period of time, and circuit means including a power reducing means for the relay coil connected into the circuit thereof to render the safety shut-off operating means ineffective, said last-named circuit means having a terminal separate from the aforesaid terminal of the safety switch operating means and switch, whereby said circuit means may be energized independently of the said operating means.

12. In a control for use with a burner device, a space thermostat, and a combustion safety switch having a switch blade movable from cold to hot contacts, the control having a timer with a timer operating means and a plurality of switch means operated thereby in timed order, a relay having a coil and a plurality of relay switches, thermostat terminals in the control for connection through the thermostat, power terminals, the sponse to momentary closure of the space thermostat switch, means to reopen the burner switch when the thermostat switch is open at the end of said period, and means to prevent reclosure of the burner switch when the combustion switch is in hot position.

17. In a control for use with a burner device, a combustion switch operable to cold and hot positions, a space thermostat switch, means including a switch adapted to be connected with the burner device and time-regulated means controlling closure of said switch for a predetermined time whereby it may establish a fixed period for closure of the switch and hence operation of the burner device during which predetermined heat losses from the space may be supplied, said time-regulating means including mechanism operated for the duration of said period in response to momentary closure of the space thermostat switch, means to reopen the burner switch when the thermostat switch is open at the end of said period, and means operable in response to disposition of the combustion switch in cold position to open the burner switch upon movement of the switch from its hot position during said fixed period.

18. In a control for use with a burner device, a combustion switch operable to hot and cold positions, a space thermostat switch, means including a switch adapted to be connected with the burner device and time-regulated means controlling closure of said switch for a predetermined time whereby it may establish a fixed period for closure of the switch and hence operation of the burner device during which predetermined heat losses from the space may be supplied, said time-regulated means including a timing motor, and switch means operated thereby, means to start the timing motor upon closure of the thermostat switch, means including one of said timing motor switch means to effect closure of the burner device switch and hence start of the burner motor into operation when the timing motor starts, and to hold the burner device switch closed for said fixed period of time, said timing motor being adapted to release said switch at the end of said period whereby the burner device switch may reopen, and means controlled by the combustion switch to cause reopening of the burner device switch if the combustion switch is not in hot position within a predetermined interval after the beginning of said period.

19. In a control for use with a burner device, a burner switch for controlling the burner device, a combustion switch operable to hot and cold positions, a space thermostat switch, control means to establish a fixed period for closure of the burner switch whereby the burner device may operate and predetermined heat losses from the space may be supplied, said control means including a timing motor, and switches operated thereby, means to start the timing motor upon closure of the thermostat switch, means including one of said timing motor switches closed when the timing motor starts to effect closure of the burner switch whereby to effect start of the burner device into operation when the timing motor starts, and said timing motor being adapted to hold its said switch closed for said fixed period of time, said timing motor being adapted to release said switch at the end of said period whereby the burner switch may reopen, means controlled by the combustion switch to open the burner device switch if the combustion switch is not in hot position within a predetermined interval after the beginning of said period, and circuit branch means to hold the burner device switch closed whereby the burner device can be held in operation after the end of said period if the space thermostat is unsatisfied.

20. In a control for use with a burner device, a burner switch for controlling the burner device, a combustion switch operable to hot and cold positions, a space thermostat switch, control means to establish a fixed period for closure of the burner switch whereby the burner device may operate and predetermined heat losses from the space may be supplied, said control means including a timing motor, and switches operated thereby, means to start the timing motor upon closure of the thermostat switch, means including one of said timing motor switches closed when the timing motor starts to effect closure of the burner switch whereby to effect start of the burner device into operation when the timing motor starts, and said timing motor being adapted to hold its said switch closed for said fixed period of time, said timing motor being adapted to release said switch at the end of said period whereby the burner switch may reopen, means comprising a safety warp switch and a heater therefor to cause opening of the burner switch whereby to stop operation of the burner device if the combustion switch is not in hot position within a predetermined interval after the beginning of said period, means operated by operation of the combustion switch to hot position to render the heater ineffective.

21. In a control for use with a burner device, a burner switch for controlling the burner device, a combustion switch operable to hot and cold positions, a space thermostat switch, control means to establish a fixed period for closure of the burner switch whereby the burner device may operate and predetermined heat losses from the space may be supplied, said control means including a timing motor, and switches operated thereby, means to start the timing motor upon closure of the thermostat switch, means including one of said timing motor switches closed when the timing motor starts to effect closure of the burner switch whereby to effect start of the burner device into operation when the timing motor starts, and said timing motor being adapted to hold its said switch closed for said fixed period of time, said timing motor being adapted to release said switch at the end of said period whereby the burner switch may reopen, means to stop operation of the burner device if combustion does not occur within a predetermined interval after the beginning of said period, and means to prevent a reclosing of the burner device switch for an additional period after it has once opened.

22. In a control for heat-change producing devices under regulation of a space thermostat, a combustion switch operable to hot and cold positions, the combination of a switch adapted to be connected with the heat-change device, a terminal adapted for connection with a space thermostat, whereby the terminal may be energized when the thermostat is closed, means connected to the thermostat terminal to close the heat-change device switch upon energization at said terminal, means independent of the room thermostat terminal to hold the said switch closed for a predetermined fixed period of time, means to render the last-named means inoperative to hold the heat-change switch closed after the end of said period, additional means connected to the thermostat terminal to hold the said switch closed after said holding means has been rendered inoperative when said terminal is energized, and mechanism including the combustion switch in cold position to cause opening of the heat-change device switch after lapse of a predetermined interval beginning with the starting of said control.

23. In a control for heat-change producing devices under regulation of a space thermostat, a combustion switch operable to cold and hot positions, the combination of a switch adapted to be connected with the heat-change device, a terminal adapted for connection with a space thermostat, whereby the terminal may be energized when the thermostat is closed, means connected to the thermostat terminal to close the heat-change device switch upon energization of said terminal, means independent of the room thermostat terminal to hold the switch closed for a predetermined fixed period of time, means to render the last-named means inoperative to hold the switch closed after the end of said period, additional means dependent upon energization of the thermostat terminal to hold the switch closed after said holding means has been rendered inoperative, and mechanism including the combustion switch in cold position to open the heat-change device switch after lapse of a predetermined interval beginning with the starting of said control, said last-named means including a warp switch and a heater therefor, and means operated by operation of the combustion switch to hot position to render the heater ineffective.

24. In a control for a heat-change producing device under regulation of a space thermostat, a switch adapted to control operation of the heat-change device, the control having a terminal for connection with the thermostat, whereby the terminal may be energized under regulation of the thermostat, a combustion safety thermostat movable from a cold position to a hot upon existence of predetermined ambient temperature conditions, starting means responsive to energization of the space thermostat terminal to close the heat-change device switch, said starting means including a safety switch operating means to effect opening of the heat-change device switch after energization for a predetermined period, and said starting means also including the safety thermostat in cold position, running means to maintain the heat-change device switch closed and including the safety thermostat in hot position without the safety switch operating means, whereby the latter becomes deenergized, and said running means also including means to hold the heat-change device switch closed for a predetermined period of time and then to render itself inoperative and effect opening of said switch.

25. In a control for use with a heating device under regulation of a space thermostat; the control having a terminal for connection with the space thermostat to be energized under regulation thereof, a combustion switch movable to cold and hot positions, a safety timing switch, operating means energizable to open the timing switch after a predetermined period of energization, a switch adapted to be connected with the heating device and means to close the said switch, connections through the thermostat terminal and timing switch operating means and the closing means for the heating device switch to effect closure of the heating device switch and operation of the operating means, other connections adapted to be completed through the thermostat terminal to hold the heating device switch closed until the thermostat terminal is deenergized, as by satisfaction of the thermostat, means adapted to be connected to be responsive to movement of the combustion switch to hot position to render the timing switch operating means ineffective to open the timing switch during the period of disposition of the combustion switch in hot position, sequential control mechanism, and means operated thereby to hold the heating device switch closed for a fixed period after energization of the thermostat terminal, said holding means being connected through and subject to the safety timing switch and rendered ineffective when the timing switch is opened.

RYDER PRATT.

REFERENCES CITED

The following references are of record in the file of this patent:

UNITED STATES PATENTS

| Number | Name | Date |
|---|---|---|
| 2,084,880 | Wotring | June 22, 1937 |
| 2,167,227 | Wilson | July 25, 1939 |
| 2,266,185 | Fillo | Dec. 16, 1941 |
| 2,323,370 | Bower | July 6, 1943 |
| 2,348,951 | Bower | May 16, 1944 |
| 2,385,616 | Eaton | Sept. 25, 1945 |
| 2,388,666 | Bower | Nov. 13, 1945 |
| 2,409,492 | Jones | Oct. 15, 1946 |